United States Patent
Jäger

[11] Patent Number: 5,744,589
[45] Date of Patent: Apr. 28, 1998

[54] DISAZO REACTIVE DYESTUFFS CONTAINING FIBER-REACTIVE RADICALS

[75] Inventor: Horst Jäger, Leverkusen, Germany

[73] Assignee: Bayer Aktiengesellschaft, Leverkusen, Germany

[21] Appl. No.: 728,925

[22] Filed: Oct. 11, 1996

[30] Foreign Application Priority Data

Oct. 20, 1995 [DE] Germany .................. 195 39 076.8

[51] Int. Cl.[6] .................. C09B 62/09; C09B 62/03; D06P 1/382; D06P 3/66
[52] U.S. Cl. .................. 534/634; 634/617
[58] Field of Search .................. 534/634

[56] References Cited

FOREIGN PATENT DOCUMENTS

| | | | |
|---|---|---|---|
| 0235729 | 9/1987 | European Pat. Off. | 534/634 |
| 2904124 | 8/1980 | Germany | 534/634 |
| 1116205 | 6/1968 | United Kingdom | 534/634 |
| 1118002 | 6/1968 | United Kingdom | 534/634 |
| 1373839 | 11/1974 | United Kingdom | 534/634 |
| 2149142 | 2/1985 | United Kingdom | 534/634 |

*Primary Examiner*—Floyd D. Higel
*Attorney, Agent, or Firm*—Sprung Kramer Schaefer & Briscoe

[57] ABSTRACT

Compounds of the formula $$X^1—B^1—D^1—N=N—K^1—Y—K^2—N=N—D^2—B^2—X^2 \quad (1)$$

are suitable as reactive dyestuffs for the dyeing or printing of substrates.

7 Claims, No Drawings

DISAZO REACTIVE DYESTUFFS CONTAINING FIBER-REACTIVE RADICALS

The invention relates to novel reactive dyestuffs, their preparation and their use.

Azo dyestuffs with two azo groups which contain fiber-reactive radicals are already known, cf. DE-A-2 515 137 and EP-A-387 589. However, the known dyestuffs still have disadvantages in their use. The present invention relates to azo reactive dyestuffs of the formula $$X^1-B^1-D^1-N=N-K^1-Y-K^2-N=N-D^2-B^2-X^2 \quad (1)$$

in which $D^1$ and $D^2$ are identical or different and represent an optionally substituted benzene or naphthalene nucleus;

$B^1$ and $B^2$ are identical or different and denote a divalent bridge member;

$X^1$ and $X^2$ are identical or different and represent a heterocyclic fiber-reactive radical;

Y represents a bifunctional acyl radical of the aliphatic or aromatic series;

$K^1$ and $K^2$ are identical or different and represent the radical of a coupling component with at least 2 sulfo groups, or of the formula

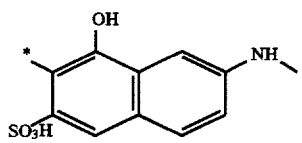

the bond identified with an asterisk being linked to the azo group.

Particularly preferred coupling components $K^1$ and $K^2$ correspond to the following formulae

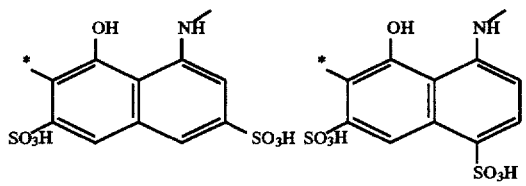

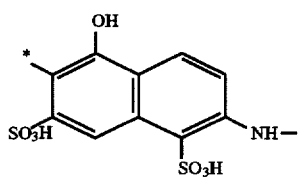

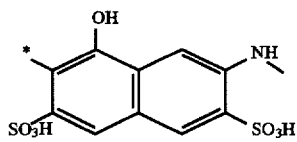

Examples of substituents of the benzene or naphthalene nuclei $D^1$ and $D^2$ are $C_1$–$C_4$-alkyl, in particular methyl, $C_1$–$C_4$-alkoxy, in particular methoxy, halogen, in particular chlorine, and the sulfo and carboxyl group.

Examples of divalent bridge members $B^1$ and $B^2$ which may be mentioned are the following:

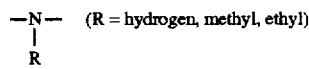

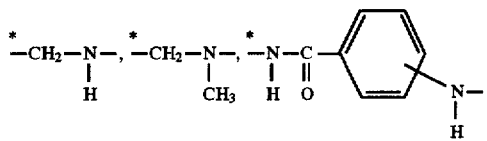

the bond identified with an asterisk being linked to the radical $D^1$ or $D^2$.

Examples of bifunctional acyl radicals Y are:

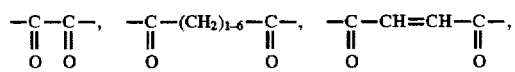

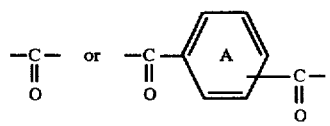

in which the two carbonyl groups of the benzene ring A are in the o-, m- or p-position relative to one another and the benzene ring A can be substituted by Cl, $CH_3$ or $OCH_3$.

Suitable fiber-reactive radicals $X^1$ and $X^2$, i.e. those which react with the OH or NH groups of the fiber under dyeing conditions to form covalent bonds, are, in particular, those which contain at least one reactive substituent bonded to a 5- or 6-membered aromatic-heterocyclic ring, for example to a monoazine, diazine or triazine ring, in particular a pyridine, pyrimidine, pyridazine, pyrazine, thiazine, oxazine or asymmetric or symmetric triazine ring, or to such a ring system which contains one or more fused-on aromatic-carbocyclic rings, for example a quinoline, phthalazine, cinnoline, quinazoline, quinoxaline, acridine, phenazine and phenanthridine ring system.

Reactive substituents on the heterocycle which are to be mentioned include, for example, halogen (Cl, Br or F), ammonium, including hydrazinium, pyridinium, picolinium, carboxypyridinium, sulfonium, sulfonyl, azido ($N_3$), thiocyanato, thiolether, oxyether, sulfinic acid and sulfonic acid.

Examples which may be mentioned specifically are:
2,4-difluorotriazin-6-yl, 2,4-dichlorotriazin-6-yl and monohalogeno-sym-triazinyl radicals, in particular monochloro- and monofluorotriazinyl radicals which are substituted by alkyl, aryl, amino, monoalkylamino, dialkylamino, aralkylamino, arylamino, morpholino, piperidino, pyrrolidino, piperazino, alkoxy, aryloxy, alkylthio or arylthio, where alkyl preferably denotes optionally substituted $C_1$–$C_4$-alkyl, aralkyl preferably denotes optionally substituted phenyl-$C_1$–$C_4$-alkyl and aryl preferably denotes optionally substituted phenyl or naphthyl, and where preferred substituents for alkyl are halogen, hydroxyl, cyano, vinylsulfonyl, substituted alkylsulfonyl, dialkylamino, morpholino, $C_2$–$C_4$-alkoxy, vinylsulfonyl-$C_2$–$C_4$-alkoxy, substituted alkylsulfonyl-$C_2$–$C_4$-alkoxy carboxyl, sulfo or sulfato, and preferred substituents for phenyl and naphthyl are sulfo, $C_1$–$C_4$-alkyl, $C_1$–$C_4$-alkoxy, carboxyl, halogen, acylamino, vinylsulfonyl, substituted alkylsulfonyl, hydroxyl or amino.

The following radicals may be mentioned specifically:
2-Amino-4-fluoro-triazin-6-yl, 2-methylamino-4-fluorotriazin-6-yl, 2-ethylamino-4-fluorotriazin-6-yl, 2-isopropylamino-4-fluoro-triazin-6-yl, 2-dimethylamino-4-fluoro-triazin-6-yl, 2-diethylamino-4-fluoro-triazin-6-yl, 2-β-methoxyethylamino-4-fluoro-triazin-6-yl, 2-β-hydroxyethylamino-4-fluoro-triazin-6-yl, 2-di-(β-hydroxyethylamino)-4-fluoro-triazin-6-yl, 2-β-sulfoethylamino-4-fluoro-triazin-6-yl, 2-β-sulfoethylmethylamino-4-fluoro-triazin-6-yl, 2-carboxymethylamino-4-fluoro-triazin-6-yl, 2-di-(carboxymethylamino)-4-fluoro-triazin-6-yl, 2-sulfomethyl-methylamino-4-fluoro-triazin-6-yl, 2-β-cyanethylamino-4-fluoro-triazin-6-yl, 2-benzylamino-4-fluoro-triazin-6-yl, 2-β-phenylethylamino-4-fluoro-triazin-6-yl, 2-benzyl-methylamino-4-fluoro-triazin-6-yl, 2-(4'-sulfobenzyl)-amino-4-fluoro-triazin-6-yl, 2-cyclohexylamino-4-fluoro-triazin-6-yl, 2-(o-, m- or p-methylphenyl)-amino-4-fluoro-triazin-6-yl, 2-(o-, m- or p-sulfophenyl)-amino-4-fluoro-triazin-6-yl, 2-(2',5'-disulfophenyl)-amino-4-fluoro-triazin-6-yl, 2-(o-,m- or p-chlorophenyl)-amino-4-fluoro-triazin-6-yl, 2-(o-, m- or p-methoxyphenyl)-amino-4-fluoro-triazin-6-yl, 2-(2'-methyl-4'-sulfophenyl)-amino-4-fluoro-triazin-6-yl, 2-(2'-methyl-5'-sulfophenyl)-amino-4-fluoro-triazin-6-yl, 2-(2'-chloro-4'-sulfophenyl)-amino-4-fluoro-triazin-6-yl, 2-(2'-chloro-5'-sulfophenyl)-amino-4-fluoro-triazin-6-yl, 2-(2'-methoxy-4'-sulfophenyl)-amino-4-fluoro-triazin-6-yl, 2-(o-, m- or p-carboxyphenyl)-amino-4-fluoro-triazin-6-yl, 2-(2',4'-disulfophenyl)-amino-4-fluoro-triazin-6-yl, 2-(3',5'-disulfophenyl)-amino-4-fluoro-triazin-6-yl, 2-(2'-carboxy-4'-sulfophenyl)-amino-4-fluoro-triazin-6-yl,2-(2'-carboxy-5'-sulfophenyl)-amino-4-fluoro-triazin-6-yl, 2-(6'-sulfonaphth-2'-yl)-amino-4-fluoro-triazin-6-yl, 2-(4',8'-disulfonaphth-2'-yl)-amino-4-fluoro-triazin-6-yl, 2-(6',8'-disulfonaphth-2'-yl)-amino-4-fluoro-triazin-6-yl, 2-(N-methyl-N-phenyl)-amino-4-fluoro-triazin-6-yl, 2-(N-ethyl-N-phenyl)-amino-4-fluoro-triazin-6-yl, 2-(N-β-hydroxyethyl-N-phenyl)-amino-4-fluoro-triazin-6-yl, 2-(N-isopropyl-N-phenyl)-amino-4-fluoro-triazin-6-yl, 2-morpholino-4-fluoro-triazin-6-yl, 2-piperidino-4-fluoro-triazin-6-yl, 2-(4',6',8'-trisulfonaphth-2'-yl)-amino-4-fluoro-triazin-6-yl, 2-(3',6',8'-trisulfonaphth-2'-yl)-amino-4-fluoro-triazin-6-yl, 2-(3',6'-disulfonaphth-1'-yl)-amino-4-fluoro-triazin-6-yl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl or N-ethyl-N-(2,4-dichlorotriazin-6-yl)-aminoacetyl, 2-methoxy-4-fluoro-triazin-6-yl, 2-ethoxy-4-fluoro-triazin-6-yl, 2-phenoxy-4-fluoro-triazin-6-yl, 2-(o-, m- or p-sulfophenoxy)-4-fluoro-triazin-6-yl, 2-(o-, m- or p-methyl or -methoxy-phenoxy)-4-fluoro-triazin-6-yl, 2-β-hydroxyethylmercapto-4-fluoro-triazin-6-yl, 2-phenylmercapto-4-fluoro-triazin-6-yl, 2-(4'-methylphenyl)-mercapto-4-fluorotriazin-6-yl, 2-(2',4'-dinitrophenyl)-mercapto-4-fluoro-triazin-6-yl, 2-methyl-4-fluoro-triazin-6-yl, 2-phenyl-4-fluoro-triazin-6-yl and the corresponding 4-chloro- and 4-bromo-triazinyl radicals and the corresponding radicals obtainable by halogen exchange with tertiary bases, such as trimethylamine, triethylamine, dimethyl-β-hydroxyethylamine, triethanolamine, N,N-dimethylhydrazine, pyridine, α-, β- or γ-picoline, nicotinic acid or isonicotinic acid, sulfinates, in particular benzenesulfinic acid, or hydrogen sulfite.

The halogenotriazinyl radicals can also be linked with a second halogenotriazinyl radical or a halogenodiazinyl radical or one or more vinylsulfonyl or sulfatoethylsulfonyl radicals, for example via a bridge member

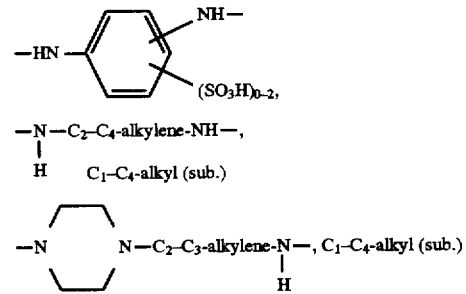

or, in the case of the sulfatoethylsulfonyl or vinylsulfonyl group, via a bridge member

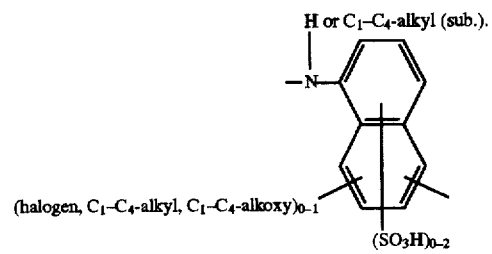

Specific examples are:

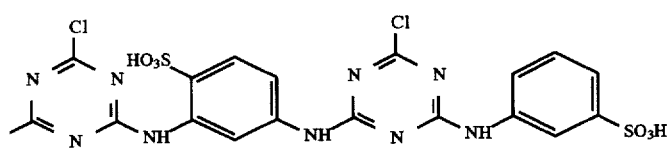

-continued
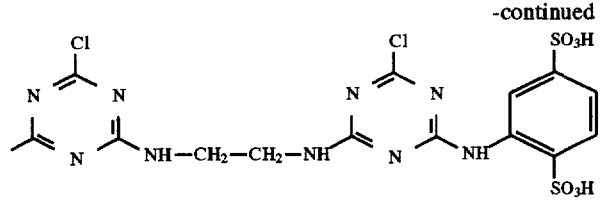
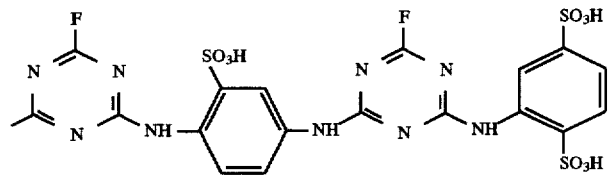
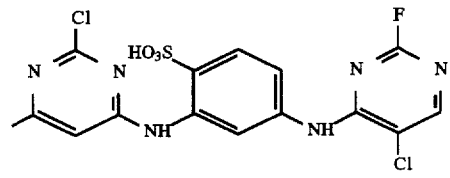
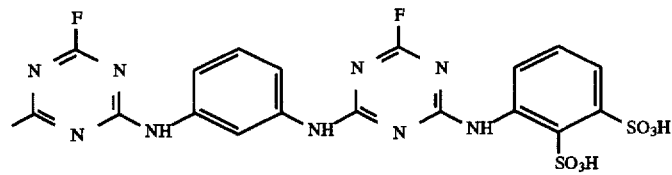
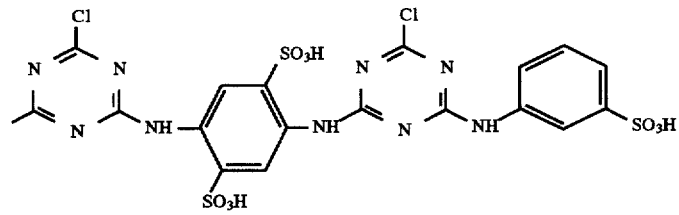
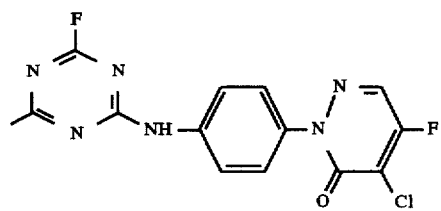
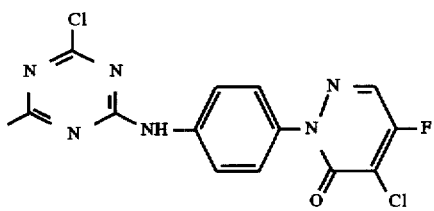
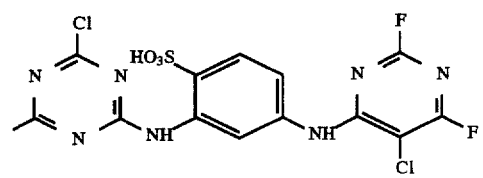
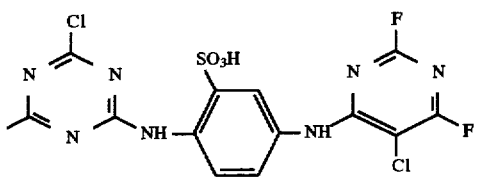
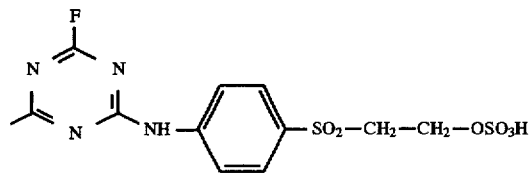
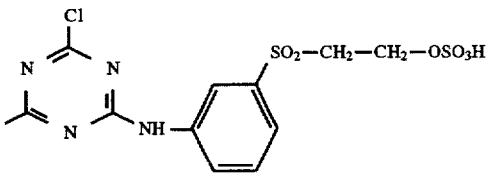

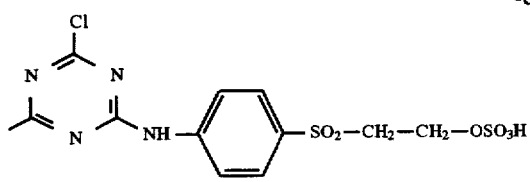
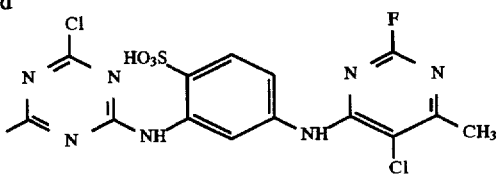
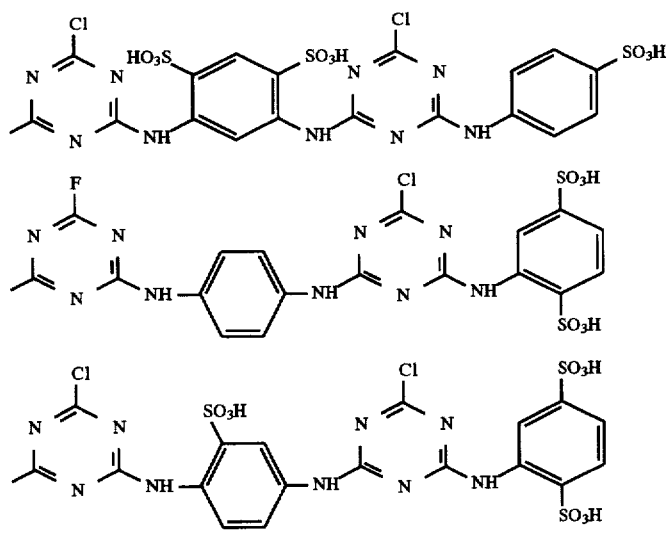

Mono-, di- or trihalogenopyrimidinyl radicals, such as 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulfo- or -5-mono-, -di- or -trichloromethyl- or -5-carbalkoxy-pyrimidin-6-yl, 2,6-dichloropyrimidine-4-carbonyl, 2,4-dichloropyrimidine-5-carbonyl, 2-chloro-4-methyl-pyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2-chloro-quinoxaline-3-carbonyl, 2- or 3-monochloroquinoxaline-6-carbonyl, 2- or 3-monochloroquinoxaline-6-sulfonyl, 2,3-dichloroquinoxaline-5- or -6-carbonyl, 2,3-dichloroquinoxaline-5- or -6-sulfonyl, 1,4-dichlorophthalazine-6-sulfonyl or -6-carbonyl, 2,4-dichloroquinazoline-7- or -6-sulfonyl or carbonyl, 2- or 3- or 4-(4',5'-dichloro-6'-pyridazon-1'-yl)-phenylsulfonyl or -carbonyl, β-(4',5'-dichloro-6'-pyridazon-1'-yl)-ethylcarbonyl, N-methyl-N-(2,3-dichloroquinoxaline-6-sulfonyl)-aminoacetyl, N-methyl-N-(2,3-dichloroquinoxaline-6-carbonyl)-aminoacetyl, and the corresponding bromine and fluorine derivatives of the abovementioned chlorine-substituted heterocyclic radicals, and among these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrirmidinyl, 5-chloro-6-dichloromethyl-2-fluoro-4-pyrimidinyl, 5-chloro-6-trichloromethyl-2-fluoro-4-pyrimidinyl, 5-chloro-2-chloromethyl-6-fluoro-4-pyrimidinyl, 5-chloro-2-dichloromethyl-6-fluoro-4-pyrimidinyl, 5-chloro-2-trichloromethyl-6-fluoro-4-pyrimidinyl, 5-chloro-2-fluorodichloromethyl-6-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl or -5-methylsulfonyl-4-pyrimidinyl, 2-fluoro-5-carbonamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 5-chloro-6-fluoro-2-methyl-4-pyrimidinyl, 5,6-difluoro-2-trifluoromethyl-4-pyrimidinyl, 6-fluoro-5-chloro-4-pyrimidinyl, 6-fluoro-4-pyrimidinyl, 5-chloro-6-fluoro-2-dichlorofluoromethyl-4-pyrimidinyl, 2-fluoro-5-chloropyrimidin-4-yl, 2-methyl-4-fluoro-5-methylsulfonylpyrimidin-6-yl, 2,6-dichloro-5-methylsulfonyl-4-pyrimidinyl, 2,6-dichloro-5-methylsulfonyl-4-pyrimidinyl, 2-fluoro-5-sulfonamido-4-pyrimidinyl, 2-fluoro-5-chloro-6-carbomethoxy-4-pyrimidinyl, and 2,6-difluoro-5-trifluoromethyl-4-pyrimidinyl; triazine radicals containing sulfonyl groups, such as 2,4-bis-(phenylsulfonyl)-triazin-6-yl, 2-(3'-carboxyphenyl)-sulfonyl-4-chlorotriazin-6-yl, 2-(3'-sulfophenyl)-sulfonyl-4-chlorotriazin-6-yl and 2,4-bis-(3'- carboxyphenylsulfonyl)-triazin-6-yl; pyrimidine rings containing sulfonyl groups, such as 2-carboxymethylsulfonyl-pyrimidin-4-yl,2-methylsulfonyl-6-methyl-pyrimidin-4-yl, 2-methylsulfonyl-6-ethyl-pyrimidin-4-yl, 2-phenylsulfonyl-5-chloro-6-methyl-pyrimidin-4-yl, 2,6-bis-methylsulfonyl-pyrimidin-4-yl, 2,6-bis-methylsulfonyl-5-chloro-pyrimidin-4-yl, 2,4-bis-methylsulfonyl-pyrimidine-5-sulfonyl, 2-methylsulfonyl-pyrimidin-4-yl, 2-phenylsulfonyl-pyrimidin-4-yl, 2-trichloromethylsulfonyl-6-methyl-pyrimidin-4-yl, 2-methylsulfonyl-5-chloro-6-methyl-pyrimidin-4-yl, 2-methylsulfonyl-5-bromo-6-methyl-pyrimidin-4-yl, 2-methylsulfonyl-5-chloro-6-ethyl-pyrimidin-4-yl, 2-methylsulfonyl-5-chloro-6-chloromethyl-pyrimidin-4-yl, 2-methylsulfonyl-4-chloro-6-methyl-pyrimidine-5-sulfonyl, 2-methylsulfonyl-5-nitro-6-methylpyrimidin-4-yl, 2,5,6-tris-methylsulfonyl-pyrimidin-4-yl, 2-methylsulfonyl-5,6-dimethyl-pyrimidin-4-yl, 2-ethylsulfonyl-5-chloro-6-methyl-pyrimidin-4-yl, 2-methylsulfonyl-6-chloro-pyrimidin-4-yl, 2,6-bis-methylsulfonyl-5-chloro-pyrimidin-4-yl, 2-methylsulfonyl-6-carboxypyrimidin-4-yl, 2-methylsulfonyl-5-sulfo-pyrimidin-4-yl, 2-methylsulfonyl-6-carbomethoxy-pyrimidin-4-yl, 2-methylsulfonyl-5-carboxy-pyrimidin-4-yl, 2-methylsulfonyl-5-cyano-6-methoxy-pyrimidin-4-yl, 2-methylsulfonyl-5-chloropyrimidin-4-yl, 2-β-sulfoethylsulfonyl-6-methyl-pyrimidin-4-yl, 2-methylsulfonyl-5-bromo-pyrimidin-4-yl, 2-phenylsulfonyl-5-chloro-pyrimidin-4-yl, 2-carboxymethylsulfonyl-5-chloro-6-methyl-pyrimidin-4-yl, 2-methylsulfonyl-6-chloropyrimidine-4- and -5-carbonyl, 2,6-bis-(methylsulfonyl)-pyrimidine-4- or -5-carbonyl, 2-ethylsulfonyl-6-chloropyrimidine-5-carbonyl, 2,4-bis-(methylsulfonyl)-pyrimidine-5-sulfonyl, 2-methylsulfonyl-4-chloro-6-methylpyrimidine-5-sulfonyl or -carbonyl, 2-chlorobenzothiazole-5- or -6-carbonyl or -5- or -6-sulfonyl, 2-arylsulfonyl- or -alkylsulfonylbenzothiazole-5- or -6-carbonyl or -5- or -6-sulfonyl, such as 2-methylsulfonyl- or 2-ethylsulfonylbenzothiazole-5- or -6-sulfonyl, or -carbonyl, 2-phenylsulfonylbenzothiazole-5- or -6-sulfonyl or -carbonyl and the corresponding 2-sulfonylbenzothiazole-5- or -6-carbonyl or -sulfonyl derivatives containing sulfo groups in the fused-on benzene ring, 2-chlorobenzoxazole-5- or -6-carbonyl or -sulfonyl, 2-chlorobenzimidazole-5- or -6-carbonyl or -sulfonyl, 2-chloro-1-methylbenzimidazole-5- or -6-carbonyl or -sulfonyl, 2-chloro-4-methyl-1,3-thiazole-5-carbonyl or -4- or -5-sulfonyl and the N-oxide of 4-chloro- or 4-nitroquinoline-5-carbonyl.

In the context of the formula (I), the following dyestuffs which have at least one of the following features 1) to 7) are preferred:

1) $X^1=X^2$
   $B^1=B^2$
   $D^1=D^2$
2) $K^1=K^2$
3) $B^1=B^2$ and represents NH
4) The radicals —$B^1$—$D^1$— and/or —$B^2$—$D^2$— represent

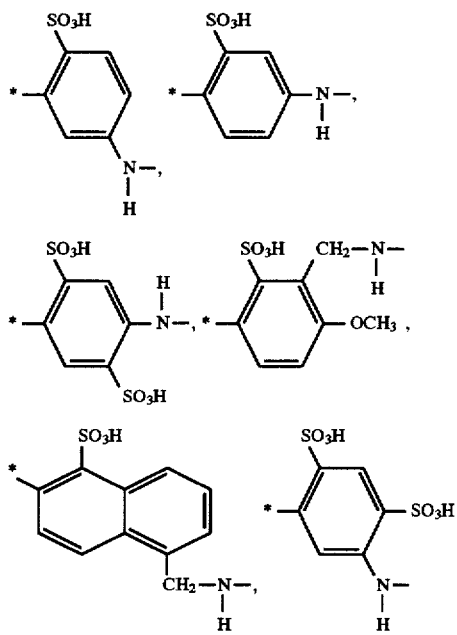

the bond identified with an asterisk being linked to the azo group.

5) The radicals $X^1$ and/or $X^2$ represent fiber-reactive radicals of the monofluorotriazine ($X^3$), monochlorotriazine ($X^4$) and fluoropyrimidine ($X^5$) series and have the following preferred meaning:

Monofluorotriazine series $X^3$

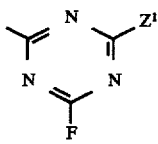

in which $Z^1$ denotes an optionally substituted amino group. Examples of $Z^1$ which may be mentioned are the following:

—NH$_2$, —NHCH$_2$CH$_2$SO$_3$H, —N(CH$_3$)CH$_2$CH$_2$SO$_3$H, —NHCH$_2$CH$_2$OSO$_3$H, —N(CH$_3$)CH$_2$CH$_2$OSO$_3$H, —NHCH$_2$COOH, —N(CH$_3$)CH$_2$COOH, —NHCH$_3$, —N(CH$_3$)$_2$, —NHC$_2$H$_5$,

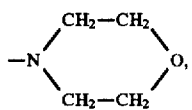

—N(C$_2$H$_5$)$_2$

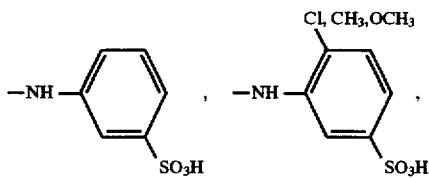

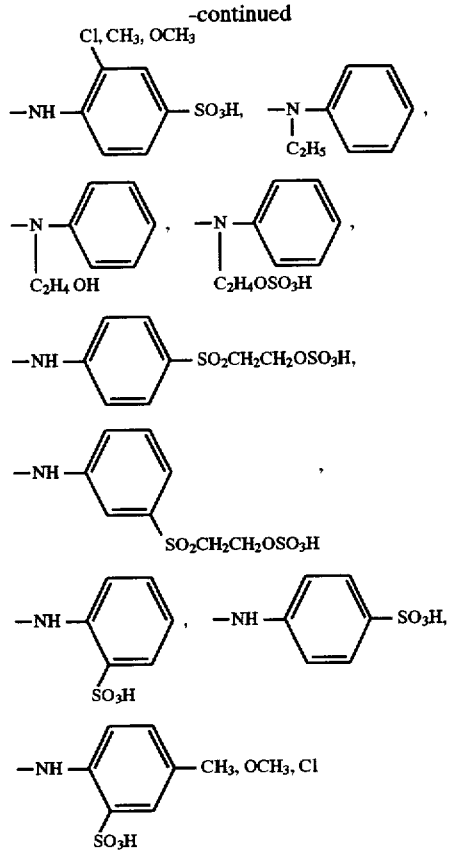

Monochlorotriazine series $X^4$

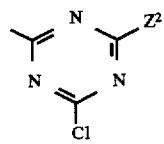

in which $Z^2$ has the meaning given for $Z^1$, and furthermore represents an optionally substituted $C_1$–$C_4$-alkoxy group. Examples of these are the following:

$OCH_3$, $OC_2H_5$, $OCH_2CH_2OH$, $OCH_2CH_2OCH_3$

Fluoropyrimidine series $X^5$

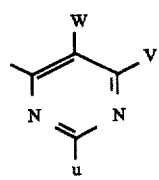

in which u, v and w represent H, F, Cl or $CH_3$, with the proviso that at least one of the substituents u or v represents F, examples which are mentioned being the following:

6) Y represents 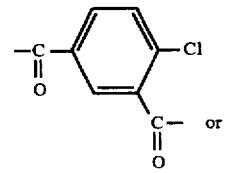

7) $K^1 = K^2$ and represents

Particularly preferred dyestuffs correspond to the formulae

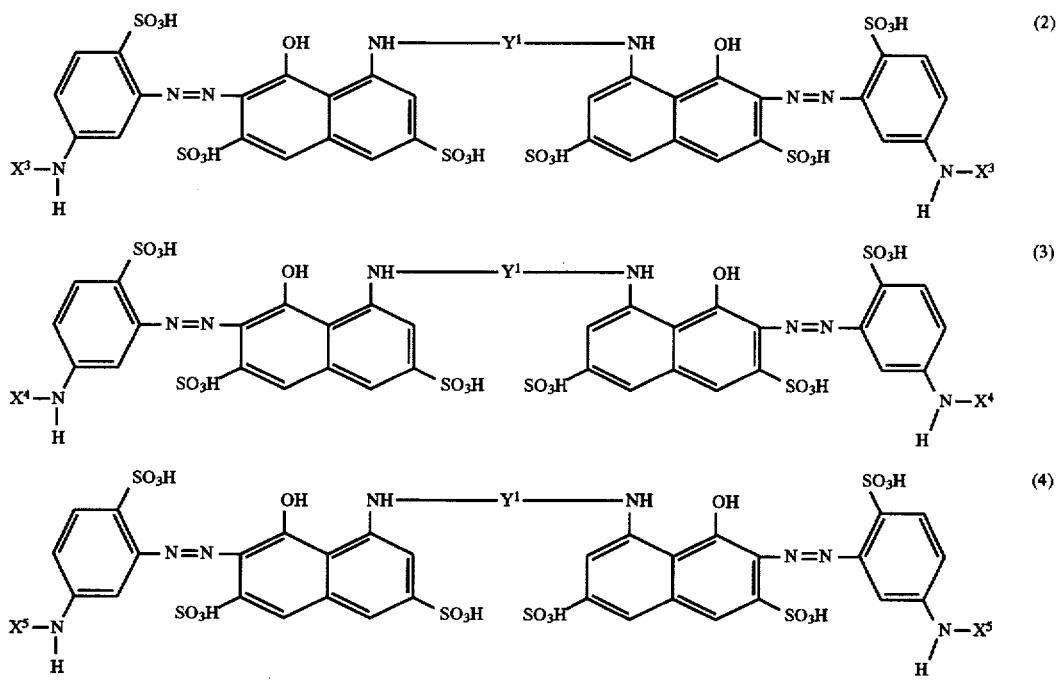

in which $Y^1$ represents

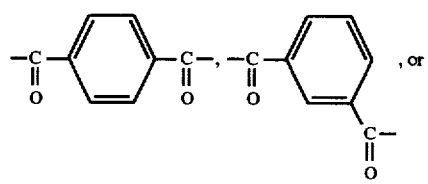, or

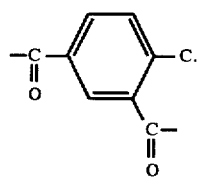

and $X^3$, $X^4$ and $X^5$ have the meaning given.

The invention furthermore relates to processes for the preparation of dyestuffs of the formula (1).

In these, diazo components of the formulae $$X^1\text{—}B^1\text{—}D^1\text{—}NH_2 \tag{5a}$$

and $$X^2\text{—}B^2\text{—}D^2\text{—}NH^2 \tag{5b},$$

in which $X^1$, $X^2$, $B^1$, $B^2$, $D^1$ and $D^2$ have the meaning given, are diazotized and the diazotization products are coupled with coupling components of the formula $$H\text{—}K^1\text{—}Y\text{—}K^2\text{—}H \tag{6}$$

in which $K^1$, $K^2$ and Y have the meaning given.

Another process comprises subjecting aminoazo dyestuffs of the formulae $$X^1\text{—}B^1\text{—}D^1\text{—}K^1\text{—}H \tag{7a}$$

and $$X^2\text{—}B^2\text{—}D^2\text{—}K^2\text{—}H \tag{7b},$$

in which $X^1$, $X^2$, $B^1$, $B^2$, $D^1$, $D^2$, $K^1$ and $K^2$ have the meaning given, to a condensation reaction with a bifunctional acyl compound of the formula $$Cl\text{—}Y\text{—}Cl \tag{8},$$

in which Y has the meaning given, to give a dyestuff of the formula (1).

Furthermore, disazo dyestuffs of the formula $$H\text{—}B^1\text{—}D^1\text{—}N{=}N\text{—}K^1\text{—}Y\text{—}K^2\text{—}N{=}N\text{—}D^2\text{—}B^2\text{—}H \tag{9}$$

in which $B^1$, $B^2$, $D^1$, $D^2$, $K^1$, $K^2$ and Y have the meaning given, can be acylated with components of the formulae $$A\text{—}X^1 \tag{10a}$$

and $$A\text{—}X^2 \tag{10b}$$

in which $X^1$ and $X^2$ have the meaning given and A represents a group which can be split off anionically, such as fluorine or chlorine.

The reaction conditions here correspond to the conditions customary in the field of acylation, diazotization and coupling. The dyestuffs are thus preferably prepared in an aqueous medium.

Examples of compounds of the formulae (6) and (8) are listed in the following:

(6)
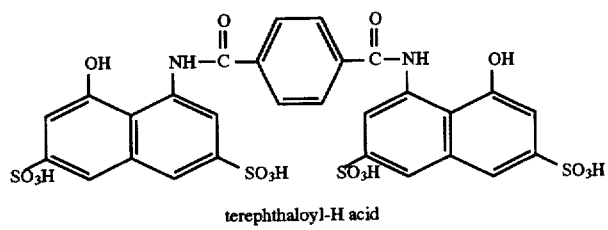
terephthaloyl-H acid
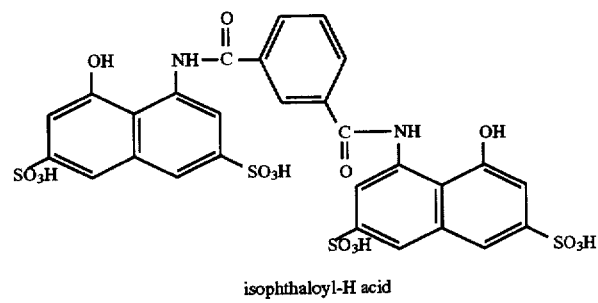
isophthaloyl-H acid
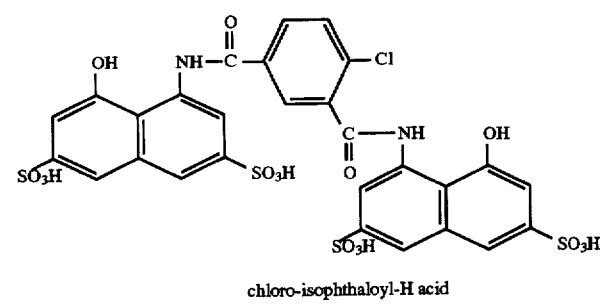
chloro-isophthaloyl-H acid
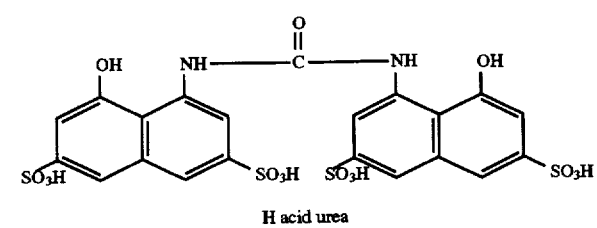
H acid urea
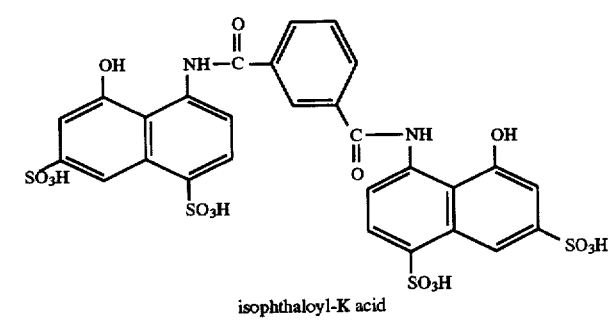
isophthaloyl-K acid -continued
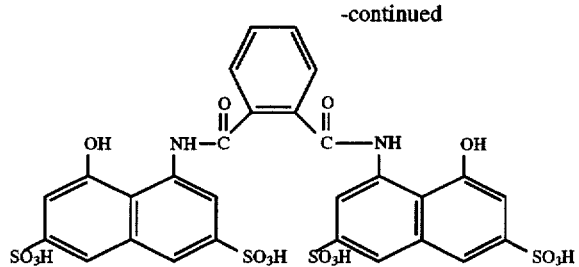
phthaloyl-H acid
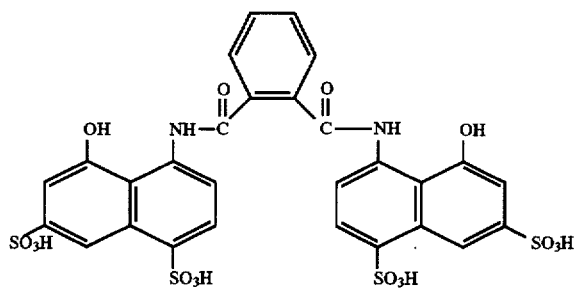
phthaloyl-K acid
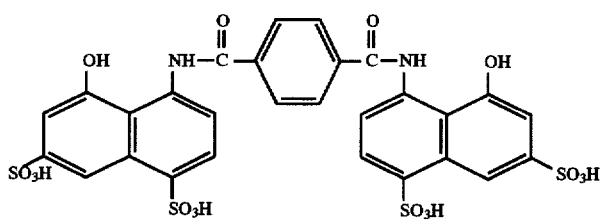
terephthaloyl-K acid
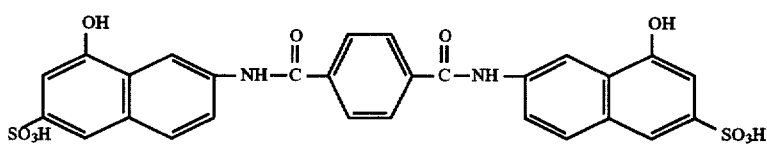
terephthaloyl-γ acid
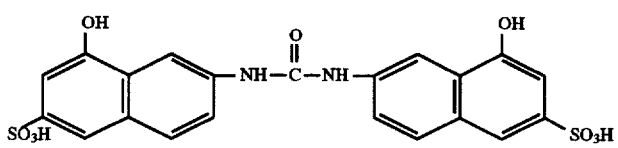
γ-acid urea
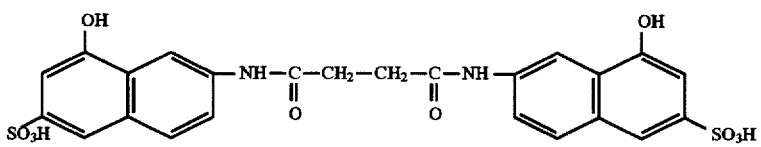
succinic acid-γ acid
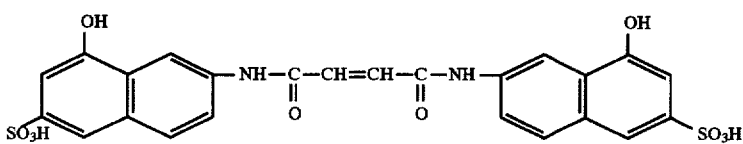
fumaroyl-γ acid

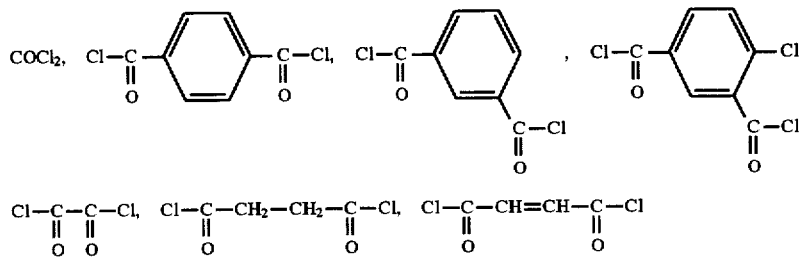

The reactive dyestuffs obtained by the processes described above are isolated in the customary manner by salting out, for example with sodium chloride or potassium chloride, or by evaporation of the neutral aqueous dyestuff solution, preferably at moderately elevated temperature under reduced pressure, or by spray drying. The dyestuffs can be employed as solid finished forms or else as concentrated solutions.

In a preferred embodiment, the dyestuffs according to the invention are used as granules. The granules of the dyestuffs according to the invention can be obtained, for example, in the following steps:

Mixed granulation

In this case, the dyestuff powder is moistened with 15 to 55% of water—based on the weight of the powder—and the granules are then formed in a mixing granulator under drying conditions and, if appropriate, the dust is removed, the dust removal agent preferably being sprayed onto the granules as an aerosol mixture.

Spray granulation

In this case, the synthesis solution or suspension is simultaneously dried and granulated in a fluidizing spray dryer.

The invention furthermore relates to solid dyestuff preparations, in particular dyestuff powders or dyestuff granules, which comprise 30–95% by weight of a reactive dyestuff of the formula (I) and 5–15% by weight of water (residual moisture), in each case based on the preparation. In addition, they can also comprise further additives, such as inorganic salts, such as alkali metal chlorides or alkali metal sulfates, dispersing agents, wetting agents, dust removal agents and other customary standardizing agents.

Preferred solid preparations additionally comprise buffer substances which give a pH of 3.5 to 7.5, in particular 4.5 to 6.5, when dissolved in 20 times the amount of water (based on the weight of the solid preparation). These buffer substances are preferably added in amounts of 3 to 50, in particular 5 to 15% by weight, based on the total weight.

Aqueous reactive dyestuff solutions in general comprise 5 to 50% by weight of a dyestuff of the formula (I) (based on the total weight of the solution).

Preferred aqueous reactive dyestuff solutions additionally comprise buffer substances and have a pH of 3.5 to 7.5, in particular 4.5 to 6.5.

These buffer substances are preferably added in amounts of 0.1 to 50, in particular 1 to 20% by weight, based on the total mixture.

The buffers used are inert toward the reactive groups. Examples of buffers are: sodium dihydrogen phosphate, sodium acetate, potassium acetate, sodium borate, potassium borate, sodium oxalate, potassium oxalate and sodium hydrogen phthalate. These buffers can be used by themselves or as a mixture.

The reactive dyestuffs of the formula (I) according to the invention have valuable dyestuff properties. As a result of the fiber-reactive groups $X^1$ and $X^2$, they have fiber-reactive properties.

The reactive dyestuffs of the formula (I) according to the invention produce dyeings with good wet- and light-fastnesses. It is worthy of particular emphasis that the dyestuffs have a good solubility and electrolyte solubility coupled with good exhaustion properties and high fixing of the dyestuffs, and that the non-fixed portions can easily be removed.

The reactive dyestuffs of the formula (I) according to the invention are suitable for the dyeing and printing of materials containing hydroxyl or amide groups, such as textile fibers, threads and woven fabrics of wool, silk and synthetic polyamide or polyurethane fibers, and for wash-fast dyeing and printing of naturally occurring or regenerated cellulose, the treatment of cellulose materials expediently being carried out in the presence of acid-binding agents and if appropriate by the action of heat, by the processes which have been disclosed for reactive dyestuffs.

The formulae given are those of the corresponding free acids. The dyestuffs are in general isolated and employed for dyeing in the form of the alkali metal salts, in particular the Na salts.

EXAMPLE 1 a) Diazotization 33.7 g of 1-amino-3-(2',6'-difluoro-5'-chloro-pyrimidin-4'-yl-amino)-benzene-6-sulfonic acid (diazo component) are stirred in 500 ml of ice-water, and 28 ml of 30% strength hydrochloric acid are added. 70 ml of 10% strength sodium nitrite solution are added dropwise in the course of one hour. The mixture is subsequently stirred for one hour and the excess nitrite is removed with amidosulfonic acid.

b) Coupling 38.4 g of terephthaloyl-H acid (coupling component) are introduced into the diazotization suspension and a pH of between 7 and 8 is maintained by sprinkling in sodium bicarbonate. The mixture is stirred at room temperature under these conditions until the coupling has ended. The dyestuff is salted out with sodium chloride, filtered off with suction, dried at 70° C. in a circulating air drying cabinet and ground. A red dyestuff powder which readily dissolves in water to give a red-colored solution results. Alternatively, the dyestuff can be isolated by spray drying the reaction mixture.

Clear red color shades with good general fastnesses are obtained on cotton by one of the dyeing processes customary for reactive dyestuffs.

In the form of the free acid, the dyestuff corresponds to the formula

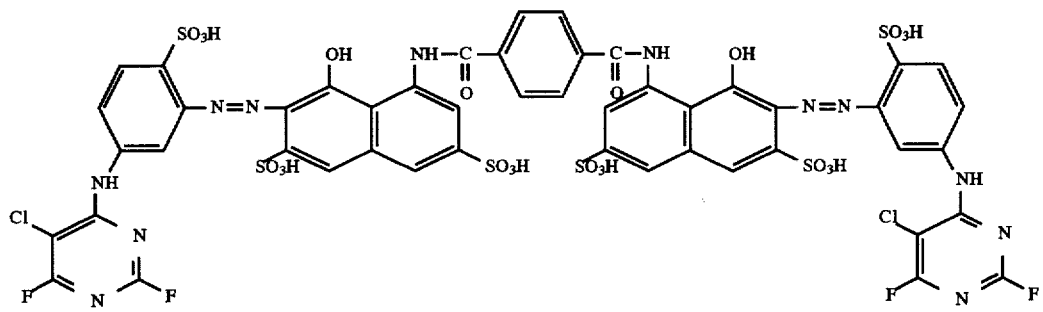

EXAMPLE 2 a) Diazotization 33.7 g of 1-amino-3-(2',6'-difluoro-5'-chloro-pyrimidin-4'-yl-amino)-benzene-6-sulfonic acid (diazo component) are stirred in 500 ml of ice-water, and 28 ml of 30% strength hydrochloric acid are added 70 ml of 10% strength sodium nitrite solution are added dropwise in the course of one hour. The mixture is subsequently stirred for one hour and the excess nitrite is removed with amidosulfonic acid.

b) Coupling 38.4 g of terephthaloyl-H acid are dissolved in 1200 ml of water at 80° C.–90° C. This solution is allowed to run into the diazotization, a pH of between 7 and 8 being maintained by sprinkling in sodium bicarbonate and the temperature being prevented from rising above 25° C.–30° C. by external cooling. The coupling rapidly goes to completion. Further working up is carried out as described in Example 1.

The dyestuff is identical to that obtained according to Example 1. Further valuable dyestuffs are obtained in accordance with the instructions of Example 1 or 2 if the diazo components listed in column 2 and the coupling components mentioned in column 3 are used. The color shades obtainable with these on cotton are listed in the last column.

| Example | Diazo component | Coupling component | Colour shade on cotton |
|---|---|---|---|
| 3 | 1-amino-3-(2',6-difluoro-5'-chloro-pyrimidinyl-4'-amino) benzene-6-sulfonic acid | isophthaloyl-H acid | red |
| 4 | 1-amino-3-(2',6-difluoro-5'-chloro-pyrimidinyl-4'-amino) benzene-6-sulfonic acid | chloro-isophthaloyl-H acid | red |
| 5 | 1-amino-3-(2',6-difluoro-5'-chloro-pyrimidinyl-4'-amino) benzene-6-sulfonic acid | terephthaloyl-K acid | yellowish-tinged red |
| 6 | 1-amino-3-(2',6-difluoro-5'-chloro-pyrimidinyl-4'-amino) benzene-6-sulfonic acid | isophthaloyl-K acid | yellowish-tinged red |
| 7 | 1-amino-3-(2',6-difluoro-5'-chloro-pyrimidinyl-4'-amino) benzene-6-sulfonic acid | chloro-isophthaloyl-K acid | yellowish-tinged red |
| 8 | 1-amino-3-(2',6-difluoro-5'-chloro-pyrimidinyl-4'-amino) benzene-6-sulfonic acid | phthaloyl-K acid | yellowish-tinged red |
| 9 | 1-amino-3-(2',6-difluoro-5'-chloro-pyrimidinyl-4'-amino) benzene-6-sulfonic acid | phthaloyl-H acid | red |
| 10 | 1-amino-3-(2',6-fluoro-5'-chloro-pyrimidinyl-4'-amino) benzene-6-sulfonic acid | fumaroyl-γ acid | scarlet |
| 11 | 1-amino-3-(6'-fluoro-5'-chloro-pyrimidinyl-4'-amino) benzene-6-sulfonic acid | terephthaloyl-H acid | red |
| 12 | 1-amino-3-(6'-fluoro-5'-chloro-pyrimidinyl-4'-amino) benzene-6-sulfonic acid | isophthaloyl-H acid | red |
| 13 | 1-amino-3-(6'-fluoro-5'-chloro-pyrimidinyl-4'-amino) benzene-6-sulfonic acid | chloro-isophthaloyl-H acid | red |
| 14 | 1-amino-3-(6'-fluoro-5'-chloro-pyrimidinyl-4'-amino) benzene-6-sulfonic acid | terephthaloyl-K acid | yellowish-tinged red |
| 15 | 1-amino-3-(6'-fluoro-5'-chloro-pyrimidinyl-4'-amino) benzene-6-sulfonic acid | isophthaloyl-K acid | yellowish-tinged red |
| 16 | 1-amino-3-(6'-fluoro-5'-chloro-pyrimidinyl-4'-amino) benzene-6-sulfonic acid | phthaloyl-H acid | red |
| 17 | 1-amino-3-(6'-fluoro-5'-chloro-pyrimidinyl-4'-amino) benzene-6-sulfonic acid | fumaroyl-γ acid | scarlet |
| 18 | 1-amino-3-(6'-fluoro-5'-chloro-pyrimidinyl-4'-amino) benzene-6-sulfonic acid | succinic acid-γ acid | scarlet |
| 19 | 1-amino-3-(2',6'-difluoro-pyrimidinyl-4'-amino) benzene-6-sulfonic acid | terephthaloyl-H acid | red |
| 20 | 1-amino-3-(2',6'-difluoro-pyrimidinyl-4'-amino) benzene-6-sulfonic acid | isophthaloyl-H acid | red |
| 21 | 1-amino-3-(2',6'-difluoro-pyrimidinyl-4'-amino) benzene-6-sulfonic acid | phthaloyl-H acid | red |
| 22 | 1-amino-3-(2',6'-difluoro-pyrimidinyl-4'-amino) benzene-6-sulfonic acid | chloro-isophthaloyl-H acid | red |
| 23 | 1-amino-3-(2',6'-difluoro-pyrimidinyl-4'-amino) benzene-6-sulfonic acid | terephthaloyl-K acid | yellowish-tinged red |
| 24 | 1-amino-3-(2',6'-difluoro-pyrimidinyl-4'-amino) benzene-6-sulfonic acid | isophthaloyl-K acid | yellowish-tinged red |
| 25 | 1-amino-3-(2',6'-difluoro-pyrimidinyl-4'-amino) benzene-6-sulfonic acid | fumaroyl-γ acid | scarlet |

-continued

| Example | Diazo component | Coupling component | Colour shade on cotton |
|---|---|---|---|
| 26 | 1-amino-3-(2',6'-difluoro-pyrimidinyl-4'-amino) benzene-6-sulfonic acid | succinic acid-γ acid | scarlet |
| 27 | 1-amino-3-(2'-fluoro-5'-chloro-pyrimidinyl-4'-amino) benzene-6-sulfonic acid | terephthaloyl-H acid | red |
| 28 | 1-amino-3-(6'-fluoro-pyrimidinyl-4'-amino) benzene-sulfonic acid-1 | terephthaloyl-H acid | red |
| 29 | 1-amino-3-(2',6'-dichloro-5'-cyano-pyrimidinyl-4'-amino) benzene-6-sulfonic acid | terephthaloyl-H acid | red |
| 30 | 1-amino-3-(2'-fluoro-5'-chloro-6'-methyl-pyrimidinyl-4'-amino) benzene-6-sulfonic acid | terephthaloyl-H acid | red |
| 31 | 1-amino-4-(2',6'-difluoro-5'-chloro-pyrimidinyl-4'-amino) benzene-6-sulfonic acid | terephthaloyl-H acid | bluish-tinged red |
| 32 | 1-amino-4-(2',6'-difluoro-5'-chloro-pyrimidinyl-4'-amino) benzene-6-sulfonic acid | terephthaloyl-K acid | red |
| 33 | 1-amino-4-(2'-fluoro-5'-chloro-pyrimidinyl-4'-amino) benzene-6-sulfonic acid | terephthaloyl-H acid | red |
| 34 | 1-amino-4-(2',6'-difluoro-pyrimidinyl-4'-amino) benzene-6-sulfonic acid | terephthaloyl-H acid | red |
| 35 | 1-amino-4-(2',6'-difluoro-pyrimidinyl-4'-amino) benzene-6-sulfonic acid | fumaroyl-γ acid | scarlet |
| 36 | 1-amino-4-(2',6'-difluoro-5'-chloro-pyrimidinyl-4'-amino) benzene-2,6-disulfonic acid | terephthaloyl-H acid | red |
| 37 | 1-amino-4-(2',6'-difluoro-5'-chloro-pyrimidinyl-4'-amino) benzene-2,6-disulfonic acid | fumaroyl-γ acid | red |
| 38 | 1-amino-4-(2',6'-difluoro-5'-chloro-pyrimidinyl-4'-amino) benzene-2,6-disulfonic acid | γ-acid urea | red |
| 39 | 1-amino-4-(2',6'-difluoro-5'-chloro-pyrimidinyl-4'-amino) benzene-2,6-disulfonic acid | terephthaloyl-K acid | red |
| 40 | 1-amino-4-(2',6'-difluoro-pyrimidinyl-4'-amino) benzene-2,6-disulfonic acid | terephthaloyl-H acid | red |
| 41 | 1-amino-4-(2',6'-difluoro-pyrimidinyl-4'-amino) benzene-2,6-disulfonic acid | γ-acid urea | red |
| 42 | 1-amino-4-(6'-fluoro-5'-chloro-pyrimidinyl-4'-amino) benzene-2,6-disulfonic acid | terephthaloyl-H acid | red |

EXAMPLE 43 a) Acylation 17.3 g of o-sulfanilic acid (amine component) are dissolved in 300 ml of ice-water under neutral conditions. 13.5 g of 2,4,6-trifluorotriazine are added dropwise at 0° C. in the course of 20 minutes, during which the pH is kept between 5.5 and 6.5 by simultaneous addition of dilute sodium hydroxide solution.

b) Condensation

A neutral solution of 18.8 g of 1,3-diamino-benzene-6-sulfonic acid (diamine component) in 200 ml of water is allowed to run at 0° C. into the reaction mixture obtained according to a), during which the pH is kept between 6 and 7 by addition of dilute sodium hydroxide solution. The temperature is then allowed to rise to room temperature. A condensation product which, in the form of the free acid, corresponds to the following structure is present in the aqueous solution.

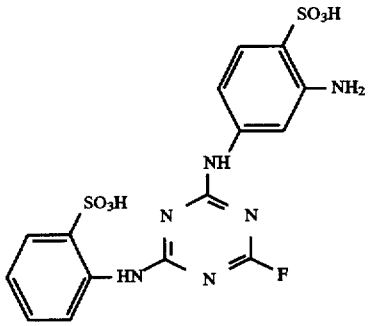

c) Diazotization 47.3 g of the diazo component obtained according to process step b) are stirred in 500 ml of ice-water, and 28 ml of 30% strength hydrochloric acid are added. 70 ml of 10% strength sodium nitrite solution are then added dropwise and the mixture is subsequently stirred for 1 hour, during which the excess of nitrite should be retained. This excess is then destroyed with amidosulfonic acid.

d) Coupling

A solution, heated to about 80° C.–90° C., of 38.4 g of terephthaloyl-H acid in 1200 ml of water is added to the diazotization such that the pH is between 6 and 8. This is achieved by sprinkling in sodium bicarbonate. The temperature is prevented from rising above 25° C.–30° C. by external cooling. The coupling rapidly goes to completion and the product is salted out with sodium chloride.

After filtration with suction, drying at 70° C. in a circulating air drying cabinet and grinding, a red dyestuff powder which readily dissolves in water to give a red-colored solution is obtained. Clear red shades with good general fastnesses are obtained with this dyestuff on cotton by the dyeing processes customary for reactive dyestuffs.

In the form of the free acid, the dyestuff corresponds to the formula

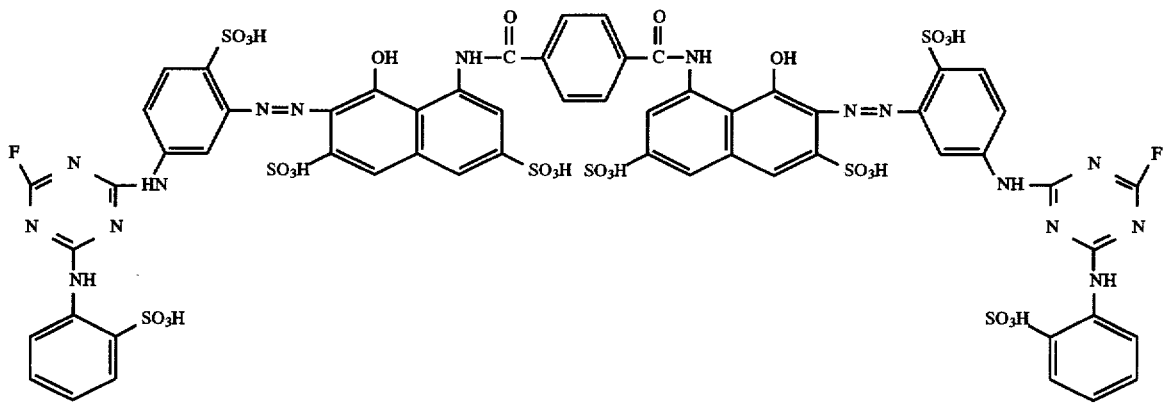

Further valuable dyestuffs are obtained in accordance with the instructions of this example if the amine components mentioned in column 2, the diamine components listed in column 3 and the coupling components described in column 4 are used. The color shades obtained with these dyestuffs on cotton are listed in the last column.

| Example | Amine component | Diamine component | Coupling component | Color shade on cotton |
|---|---|---|---|---|
| 44 | 1-amino-2-methyl-benzene-5-sulfonic acid | 1,3-diamino-benzene-4-sulfonic acid | terephthaloyl-H acid | red |
| 45 | 1-amino-2-methoxy-benzene-5-sulfonic acid | 1,3-diamino-benzene-4-sulfonic acid | terephthaloyl-H acid | red |
| 46 | 1-amino-2-chloro-benzene-5-sulfonic acid | 1,3-diamino-benzene-4-sulfonic acid | terephthaloyl-H acid | red |
| 47 | 1-amino-2-methyl-4-sulfonic acid | 1,3-diamino-benzene-4-sulfonic acid | terephthaloyl-H acid | red |
| 48 | 1-amino-benzene-2-sulfonic acid | 1,3-diamino-benzene-4-sulfonic acid | isophthaloyl-H acid | red |
| 49 | 1-amino-benzene-2-sulfonic acid | 1,3-diamino-benzene-4-sulfonic acid | terephthaloyl-K acid | red |
| 50 | 2-amino-naphthalene-1-sulfonic acid | 1,3-diamino-benzene-4-sulfonic acid | terephthaloyl-H acid | red |

EXAMPLE 51 a) Acylation 17.3 g of m-sulfanilic acid (amine component) are dissolved in 300 ml of ice-water under neutral conditions. 18.9 g of cyanuric chloride are then sprinkled in and the pH is allowed to drop to 3, where it is then kept by dropwise addition of dilute sodium hydroxide solution.

b) Condensation

A neutral solution of 18.8 g of 1,3-diamino-benzene-6-sulfonic acid is added to the reaction mixture obtained according to a), the pH is kept between 6 and 7 with dilute sodium hydroxide solution and the temperature is increased to 20° C.–30° C. A condensation product which, in the form of the free acid, corresponds to the following structure is then present in the aqueous solution.

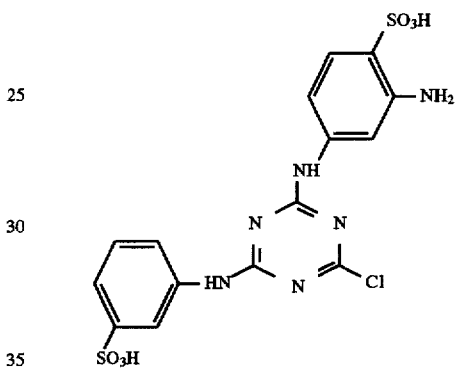

c) Diazotization 45.6 g of the diazo component obtained in accordance with the process described above are stirred in 500 ml of ice-water, and 28 ml of 30% strength hydrochloric acid are added. 70 ml of 10% strength sodium nitrite solution are then added dropwise and the mixture is subsequently stirred for about 1 hour, during which the excess of nitrite should be retained. This excess is then destroyed with amidosulfonic acid.

d) Coupling

A solution, heated to 80° C.–90° C., of 38.4 g of terephthaloyl-H acid in 1200 ml of water is added to the diazotization. During this, the pH is kept between 7 and 8 by sprinkling in sodium bicarbonate. The temperature is prevented from rising above 25° C.–30° C. by external cooling. The coupling rapidly goes to completion. The dyestuff is salted out with sodium chloride. After filtration with suction, drying at 70° C. in a circulating air drying cabinet and grinding, a red dyestuff powder which readily dissolves in water to give a red-colored solution is obtained. Clear red dyeings with good general fastnesses are obtained with this dyestuff on cotton by one of the dyeing processes customary for reactive dyestuffs. In the form of the free acid, the dyestuff corresponds to the formula

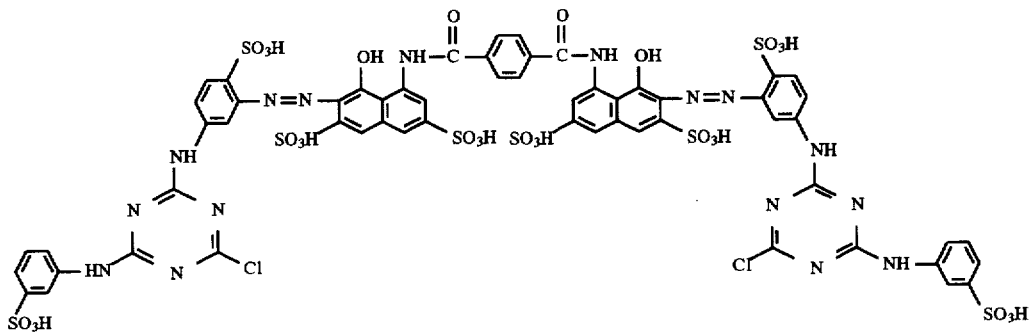

Further valuable dyestuffs are obtained in accordance with the instructions of this example if the amine components mentioned in column 2, the diamine components listed in column 3 and the coupling components described in column 4 are used. The color shades obtained with these dyestuffs on cotton are listed in the last column.

| Example | Amine component | Diamine component | coupling component | Color shade on cotton |
|---|---|---|---|---|
| 52 | 1-amino-benzene-2-sulfonic acid | 1,3-diamino-benzene-4-sulfonic acid | terephthaloyl-H acid | red |
| 53 | 1-amino-benzene-2-sulfonic acid | 1,3-diamino-benzene-4-sulfonic acid | isophthaloyl-H acid | red |
| 54 | 1-amino-benzene-2-sulfonic acid | 1,3-diamino-benzene-4-sulfonic acid | chloro-isophthaloyl-H acid | red |
| 55 | 1-amino-benzene-2-sulfonic acid | 1,3-diamino-benzene-4-sulfonic acid | terephthaloyl-K acid | yellowish tinged red |
| 56 | 1-amino-benzene-2-sulfonic acid | 1,3-diamino-benzene-4-sulfonic acid | fumaroyl-γ acid | scarlet |
| 57 | 1-amino-benzene-2,5-disulfonic acid | 1,3-diamino-benzene-4-sulfonic acid | terephthaloyl-H acid | red |
| 58 | 1-amino-benzene-2,5-disulfonic acid | 1,3-diamino-benzene-4-sulfonic acid | isophthaloyl-H acid | red |
| 59 | 1-amino-benzene-2,5-disulfonic acid | 1,3-diamino-benzene-4-sulfonic acid | terephthaloyl-K acid | yellowish tinged red |
| 60 | 1-Amino-benzene-3-sulfonic acid | 1,3-diamino-benzene-4-sulfonic acid | isophthaloyl-H acid | red |

EXAMPLE 61

0.05mol of the dyestuff of the formula

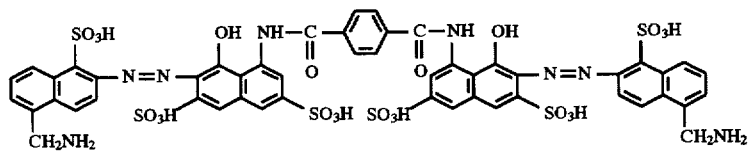

(obtainable by coupling diazotized 2-amino-5-aminomethyl-naphthalene-1-sulfonic acid to terephthaloyl-H acid in a neutral medium) is stirred in 1 l of water. 16.9 g of 2,4,6-trifluoro-5-chloropyrimidine are added dropwise at 20°–22° C., the pH being kept at 8.5–8.8 by simultaneous dropwise addition of dilute sodium hydroxide solution. When the condensation reaction has ended, the dyestuff is salted out. After filtration with suction, drying at 70° C. in a circulating air drying cabinet and grinding, a red dyestuff powder which readily dissolves in water to give a red-colored solution is obtained. In the form of the free acid, the dyestuff corresponds to the formula

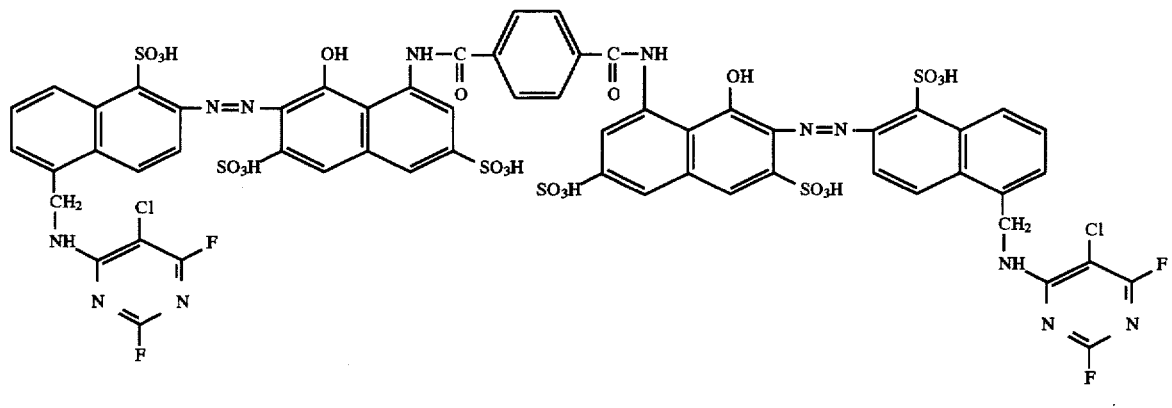

Clear bluish-tinged red dyeings with good general fastnesses are obtained with this dyestuff on cotton by one of the dyeing processes customary for the reactive dyestuffs.

Further valuable reactive dyestuffs which dye cotton bluish-tinged red are obtained in accordance with the instructions of this example if the following reactive components listed in column 2 are used instead of 2,4,6-trifluoro-5-chloro-pyrimidine, and the temperatures mentioned in column 3 are maintained here during the condensation reaction.

| Example | Reactive component | Temperature |
|---|---|---|
| 62 | 2,4,6-trifluoro-pyrimidine | 15–25° |
| 63 | 4,6-difluoro-5-chloro-pyrimidine | 30–40° |
| 64 | 2-(2'-sulfophenylamino)-4,6-difluoro-triazine | 0–10° |
| 65 | 2-(2'-sulfophenylamino)-4,6-dichloro-triazine | 20–30° |
| 66 | 2-(3'-sulfophenylamino)-4,6-dichloro-triazine | 20–30° |
| 67 | 2,4,6-trichloro-5-cyano-pyrimidine | 40–50° |
| 68 | 2,4-difluoropyrimidine | 15–25° |
| 69 | 4,6-difluoropyrimidine | 15–25° |
| 70 | 2,4,6-trichlorotriazine | 0–5° |
| 71 | 2,4-difluoro-5-chloro-pyrimidine | 30–40° |

I claim:
1. An azo reactive dyestuff of the formula

$$X^1-B^1D^1-N=N-K^1-Y-K^2-N=N-D^2-B^2-X^2 \quad (1)$$

in which $D^1$ and $D^2$ are identical or different and represent an unsubstituted or substituted benzene or naphthalene nucleus wherein the substituents are selected from the group consisting of $C_1$–$C_4$-alkyl, $C_1$–$C_4$-alkoxy, halogen, a sulfo group, or a carboxyl group;

$B^1$ and $B^2$ are identical or different and are a divalent bridge member selected from the group consisting of

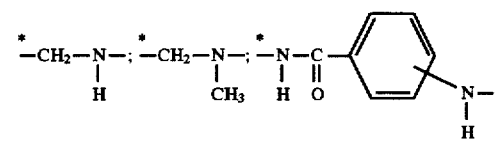

wherein

R is hydrogen, methyl or ethyl and the bond identified by the asterisk is the one linked to the $D^1$ or $D^2$ radical;

$X^1$ and $X^2$ are identical or different and represent a heterocyclic fiber-reactive radical which contains at least one reactive substituent wherein said fiber-reactive radical is selected from the group consisting of pyridine, pyrimidine, pyridazine, pyrazine, thiazine, oxazine, an asymmetric or symmertric triazine ring, quinoline, phthalazine, quinazoline, quinoxaline, acridine, phenazine and phenanthridine and the reactive substituents is selected from the group consisting of halogen, ammonium group, pyridinium group, picolinium group, carboxypyridinium group, sulfonium group, sulfonyl group, azido group, thiocynato group, thioether group, oxyether group, sulfinate group or sulfonate group;

Y represents a group selected from the group consisting of

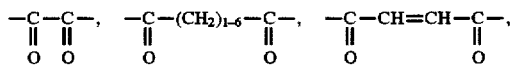

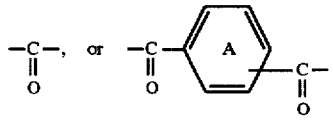

in which the two carbonyl groups of the benzene ring A are in the o-, m- or p-position relative to one another and the benzene ring A is unsubstituted or substituted by Cl, $CH_3$ or $OCH_3$; and $K^1$ and $K^2$ are identical or different and represent the following groups

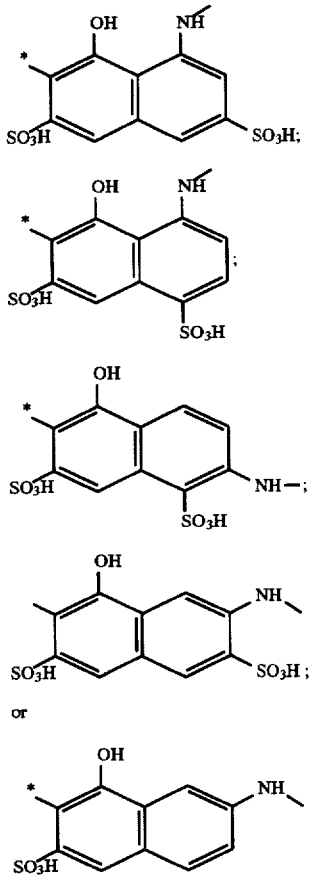

wherein the bond identified with the asterisk is linked to the azo group.

2. A reactive dyestuff according to claim 1, wherein $X^1$ and $X^2$ are identical or different and represent unsubstituted or substituted 2,4-difluorotriazin-6-yl, unsubstituted or substituted 2,4-dichlorotriazin-6-yl, unsubstituted or substituted 2,4-dichlorotriazin-6-yl, and unsubstituted or substituted monohalogeno-sym-triazinyl wherein the substituents are selected from the group consisting of unsubstituted or substituted $C_1$–$C_4$-alkyl, unsubstituted or substituted phenyl, unsubstituted or substituted naphthyl, amino, unsubstituted or substituted mono-$C_1$–$C_4$-alkylamino, unsubstituted or substituted -$C_1$–$C_4$-dialkylsubstituted amino, unsubstituted or substituted phenyl-$C_1$–$C_4$-alkyl, unsubstituted or substituted phenylamino, unsubstituted or substituted phenyl-$C_1$–$C_4$-alkylamino, morpholino, piperidino, pyrrolidino, piperazino, unsubstituted or substituted $C_1$–$C_4$-alkoxy, phenyloxy, unsubstituted or substituted $C_1$–$C_4$-alkylthio, unsubstituted or substituted naphthoxy, unsubstituted or substituted naphthylthio, unsubstituted or substituted naphthyamino, unsubstituted or substituted naphthyl-$C_1$–$C_4$-alkylamino, unsubstituted or substituted naphthyl-$C_1$–$C_4$-alkyl or unsubstituted or substituted phenylthio, wherein the substituents for the alkyl groups are halogen, hydroxyl, cyano, vinylsulfonyl, substituted alkylsulfonyl, dialkylamino, morpholino, $C_2$–$C_4$-alkoxy, vinylsulfonyl-$C_2$–$C_4$-alkoxy, alkylsulfonyl-$C_2$–$C_4$-alkoxy, carboxyl, sulfo or sulfato, and the substituents on the phenyl or naphthyl groups are sulfo, $C_1$–$C_4$-alkyl, $C_1$–$C_4$-alkoxy, carboxyl, halogen, acylamino, vinylsulfonyl, alkylsulfonyl, hydroxyl or amino.

3. A reactive dyestuff according to claim 1, wherein $X^1$ or $X^2$ are identical or different and represent 2-amino-4-fluoro-triazin-6-yl, 2-methylamino-4-fluorotriazin-6-yl, 2-ethylamino-4-fluorotriazin-6-yl, 2-isopropylamino-4-fluoro-triazin-6-yl, 2-dimethylamino-4-fluorotriazin-6-yl, 2-diethylamino-4-fluoro-triazin-6-yl, 2-β-methoxy-ethylamino-4-fluoro-triazin-6-yl, 2-β-hydroxyethylamino-4-fluoro-triiazin-6-yl, 2-di-(β-hydroxyethylamino)-4-fluoro-triazin-6-yl, 2-β-sulfoethylamino-4-fluoro-triazin-6-yl, 2-β-sulfoethyl-methyl-amino-4-fluoro-triazin-6-yl, 2-carboxymethylamino-4-fluoro-triazin-6-yl, 2-di-(carboxy-methylamino)-4-fluoro-triazin-6-yl, 2-sulfomethyl-methylamino-4-fluoro-triazin-6-yl, 2-β-cyanethylamino-4-fluoro-triazin-6-yl, 2-benzylamino-4-fluoro-triazin-6-yl, 2-β-phenylethylamino-4-fluoro-triazin-6-yl, 2-benzyl-methylamino-4-fluoro-triazin-6-yl, 2-(4'-sulfobenzyl)-amino-4-fluoro-triazin-6-yl, 2-cyclohexylamino-4-fluoro-triazin-6-yl, 2-(o-, m- or p-methylphenyl)-amino-4-fluoro-triazin-6-yl , 2-(o-, m- or p-sulfophenyl)-amino-4-fluoro-triazin-6-yl, 2-(2', 5'-disulfophenyl)-amino-4-fluoro-triazin-6-yl,2-(o-,m- or p-chlorophenyl)-amino-4-fluoro-triazin-6-yl,2-(o-, m- or p-methoxyphenyl)-amino-4-fluoro-triazin-6-yl, 2-(2'-methyl-4'-sulfophenyl)-amino-4-fluoro-triazin-6-yl, 2-(2'-methyl-5'-sulfophenyl)-amino-4-fluoro-triazin-6-yl, 2-(2'-chloro-4'-sulfophenyl)-amino-4-fluoro-triazin-6-yl, 2-(2'-chloro-5'-sulfophenyl)-amino-4-fluoro-triazin-6-yl, 2-(2'-methoxy-4'-sulfophenyl)-amino-4-fluoro-4-triazin-6-yl, 2-(o-, m- or p-carboxyphenyl)-amino-4-fluoro-triazin-6-yl, 2-(2',4'-disulfophenyl)-amino-4-fluoro-triazin-6-yl, 2-(3',5'-disulfophenyl)-amino-4-fluoro-triazin-6-yl, 2-(2'-carboxy-4'-sulfophenyl)-amino-4-fluoro-triazin-6-yl, 2-(2'-carboxy-5'-sulfophenyl)-amino-4-fluoro-triazin-6-yl, 2-(6'-sulfonaphth-2'-yl)-amino-4-fluoro-triazin-6-yl, 2-(4',8'-disulfonaphth-2'-yl)-amino-4-fluoro-triazin-6-yl, 2-(6',8'-disufonaphth-2'-yl)-amino-4-fluoro-triazin-6-yl, 2-(N-methyl-N-phenyl)-amino-4-fluoro-triazin-6-yl, 2-(N-ethyl-N-phenyl)-amino-4-fluoro-triazin-6-yl, 2-(N-β-hydroxyethyl-N-phenyl)-amino-4-fluoro-triaizin-6-yl, 2-(N-isopropyl-N-phenyl)-amino-4-fluoro-triazin-6-yl, 2-morpholino-4-fluoro-triazin-6-yl, 2-piperidino-4-fluoro-triazin-6-yl, 2-(4',6',8'-trisulfonaphth-2'-yl)-amino-4-fluoro-triazin-6-yl, 2-(3', 6',8'-trisulfonaphth-2'-yl)-amino-4-fluoro-triazin-6-yl, 2-(3',6'-disulfonaphth-1'-yl)-amino-4-fluoro-triazin-6-yl, N-methyl-N-(2,4-dichlorotriazin-6-yl)-carbamyl, N-methyl-N-(2-methylamino-4-chlorotriazin-6-yl)-carbamayl, N-methyl-N-(2-dimethylamino-4-chlortriazin-6-yl)-carbamyl, N-methyl or N-ethyl-N-(2, 4-dichlorotriazin-6-yl)-aminoacetyl, 2-methoxy-4-fluoro-triazin-6-yl-, 2-ethoxy-4-fluorotriazin-6-yl, 2-phenoxy-4-fluoro-triazin-6-yl, 2-(o-, m- or p-sulfophenoxy)-4-fluorotriazin-6-yl, 2-(o-, m- or p-methyl or -methoxy-phenoxy)-4-fluoro-triazin-6-yl, 2-β-hydroxyethylmercapto-4-fluoro-triazin-6-yl, 2-phenylmercapto-4-fluoro-triazin-6-yl, 2-(4'-methylphenyl)-mercapto-4-fluorotriazin-6-yl, 2-(2',4'-dinitrophenyl)-mercapto-4-fluoro-triazin-6-yl, 2-methyl-4-fluoro-triazin-6-yl, 2-phenyl-4-fluoro-triazin-6-yl and the corresponding 4-chloro- and 4-bromo-triazinyl radicals and the corresponding radicals obtainable by halogen exchange with tertiary bases, such as trimethylamine, triethylamine, dimethyl-β-hydroxyethylamine, triethanolamine, N,N-dimethylhydrazine, pyridine, α-, β- or γ-picoline, nicotinic acid or isonicotinic acid, benzensulfinic acid, or hydrogen sulfite.

4. A reactive dyestuff according to claim 1 wherein $X^1$ and $X^2$ are identical or different and represent a monofluorotriazine, monochlorotriazine or fluoropyrimidine radical.

5. A reactive dyestuff according to claim 1, wherein —$B^1$—$D^1$ or —$B^2$—$D^2$ represent

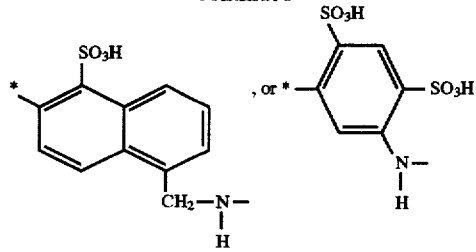

wherein the bond identified with the asterisk is linked to the azo group.

6. A reactive dyestuff according to claim 1, which corresponds to one of the following formulae

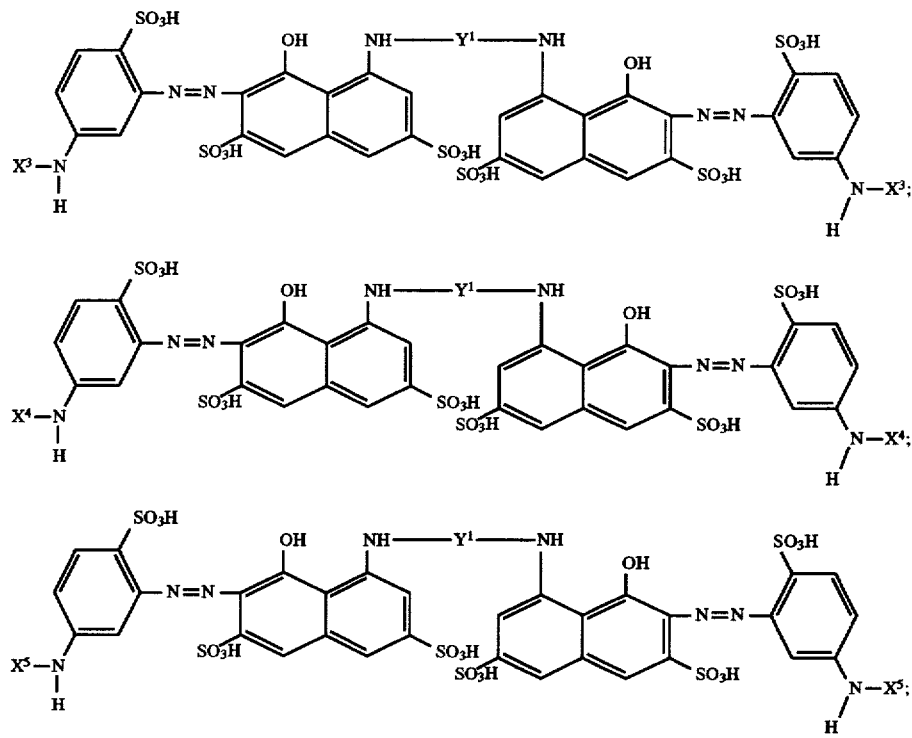

in which $Y^1$ represents

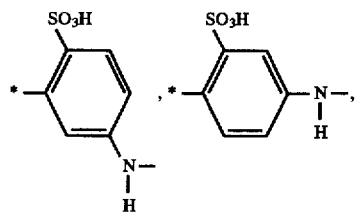

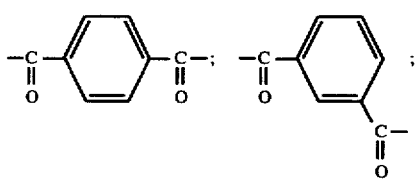

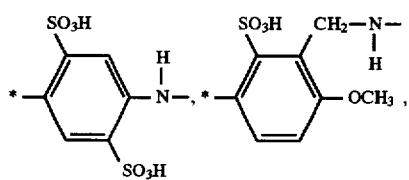

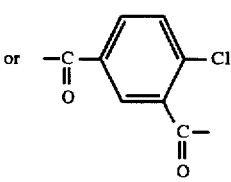

X³ is 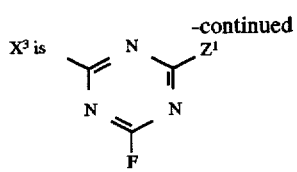

in which $Z^1$ denotes an amino group,

X⁴ is 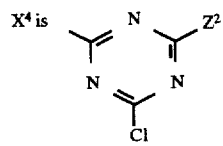

in which $Z^2$ is an amino group or an unsubstituted or substituted $C_1$-$C_4$-alkoxy group, wherein the substituents are halogen, hydroxyl, cyano, vinylsulfonyl, substituted alkylsulfonyl, dialkylamino, morpholino, $C_2$-$C_4$-alkoxy, vinylsulfonyl-$C_2$-$C_4$-alkoxy, alkylsulfonyl-$C_2$-$C_4$-alkoxy, carboxyl, sulfo or sulfato, and X⁵ is 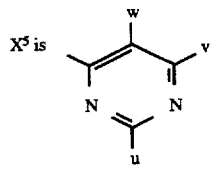

in which u, v and w represent H, F, Cl or $CH_3$ with the proviso that at least one of the substituents u or v represents F.

7. A process for preparing a reactive dyestuff according to claim 1, which comprises either a) diatotizing a diazo component of the formula

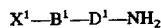

or

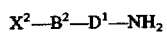

and subsequently reacting the product formed with a group of the formula

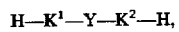

or b) reacting an aminoazo dyestuff of the formulae

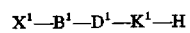

or

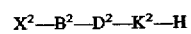

with a bifunctional acyl compound of the formula

or c) acylating a diazo dyestuff of the formula

with a compound of the formula

or

in which A is fluorine or chlorine wherein $X^1$, $X^2$, $B^1$, $B^2$, $D^1$, $D^2$, $K^1$ $K^2$ and Y are as defined in claim 1.

* * * * *

UNITED STATES PATENT AND TRADEMARK OFFICE
CERTIFICATE OF CORRRECTION

PATENT NO. : 5,744,589
DATED : 4/28/98
INVENTOR(S) : Horst Jäger

Page 1 of 2

It is certified that error appears in the above-identified patent and that said Letters Patent is hereby corrected as shown below:

On the title page, item [56], insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 0 | 6 | 9 | 2 | 1 | 8 | 01/17/78 | Hegar | | | |
| | | 5 | 5 | 6 | 9 | 7 | 4 | 7 | 10/29/06 | Jager et al. | | | |
| | | 4 | 9 | 8 | 8 | 8 | 0 | 2 | 01/29/91 | Loeffler et al. | | | |
| | | | | | | | | | | | | | |

UNITED STATES PATENT AND TRADEMARK OFFICE
CERTIFICATE OF CORRRECTION

PATENT NO. : 5,744,589
DATED : 4/28/98
INVENTOR(S) : Horst Jäger

It is certified that error appears in the above-identified patent and that said Letters Patent is hereby corrected as shown below:

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 9 | 1 | 3 | 7 | 6 | 7 | 02/26/58 | England | | | | |
| | | 1 | 4 | 1 | 9 | 7 | 6 | 9 | 10/02/69 | Germany | | | |
| | | DE | 43 | 29 | 42 | 0 | A | 1 | 03/02/95 | Germany | | | |
| | | EP | 02 | 35 | 72 | 9 | A | 2 | 09/09/87 | Europe | | | |
| | | | | | | | | | | | | | |

Signed and Sealed this

Twentieth Day of April, 1999

*Attest:*

Q. TODD DICKINSON

*Attesting Officer*   *Acting Commissioner of Patents and Trademarks*